INVENTOR.
GILBERT W. MEYERS
BY
*L. Fredrick Samann*
ATTORNEY

INVENTOR.
GILBERT W. MEYERS
BY
ATTORNEY

INVENTOR.
GILBERT W. MEYERS

United States Patent Office 3,056,848
Patented Oct. 2, 1962

3,056,848
PORTABLE GENERATOR UTILIZING DIRECT
CONVERSION OF HEAT TO ELECTRICITY
Gilbert W. Meyers, Canoga Park, Calif., assignor to
North American Aviation, Inc.
Filed July 24, 1961, Ser. No. 126,125
6 Claims. (Cl. 136—4)

The present invention is directed to electrical generators and more particularly to fuel-fired portable generating devices utilizing direct conversion of heat to electricity. The conventional portable power supplies of the prior art are generally of the gasoline-engine electrical generator or battery type. The engine-driven type is relatively heavy and requires vehicle transportation for use in remote areas. The battery-operated type, used in communications for example, while portable, has a very limited battery lifetime and restricted operability under extreme operating conditions, i.e., sub-zero environment. In military or rescue operations, communications are extremely important and the lifetime and/or weight of the power generating equipment constitutes a limitation upon communications capability. It is the object of the present invention to overcome these disadvantages of prior art devices.

The primary object of the present invention is to provide a small portable electrical generating power supply unit which can easily be carried by a man.

Another object of the present invention is to provide a self-contained electrical power supply of light weight for use in remote communications or emergency operations.

A further object of the present invention is to provide a self-contained portable electrical power supply having a long lifetime and fueled with conventional burner fuel.

A still further object of the present invention is to provide a self-contained portable electrical power supply which is resistant to mechanical shock and is fast starting.

A still further object of the present invention is to provide a self-contained portable electrical power supply which is operable for long periods of time under sub-zero weather conditions.

Another object of the present invention is to provide a portable electric power supply which converts the heat of combustion of the fuel directly to electricity.

Another object of the present invention is to provide a portable electric power supply using conventional fuel which converts the heat of combustion of the fuel to electricity by thermoelectric devices.

A still further object of the present invention is to provide an electrical power generator utilizing heat to electricity conversion devices where forced convection cooling is used on the cold junction of the conversion devices.

These and other objects and advantages of the present invention will be more apparent from the following description and drawings, made a part hereof, in which.

Figure 1:
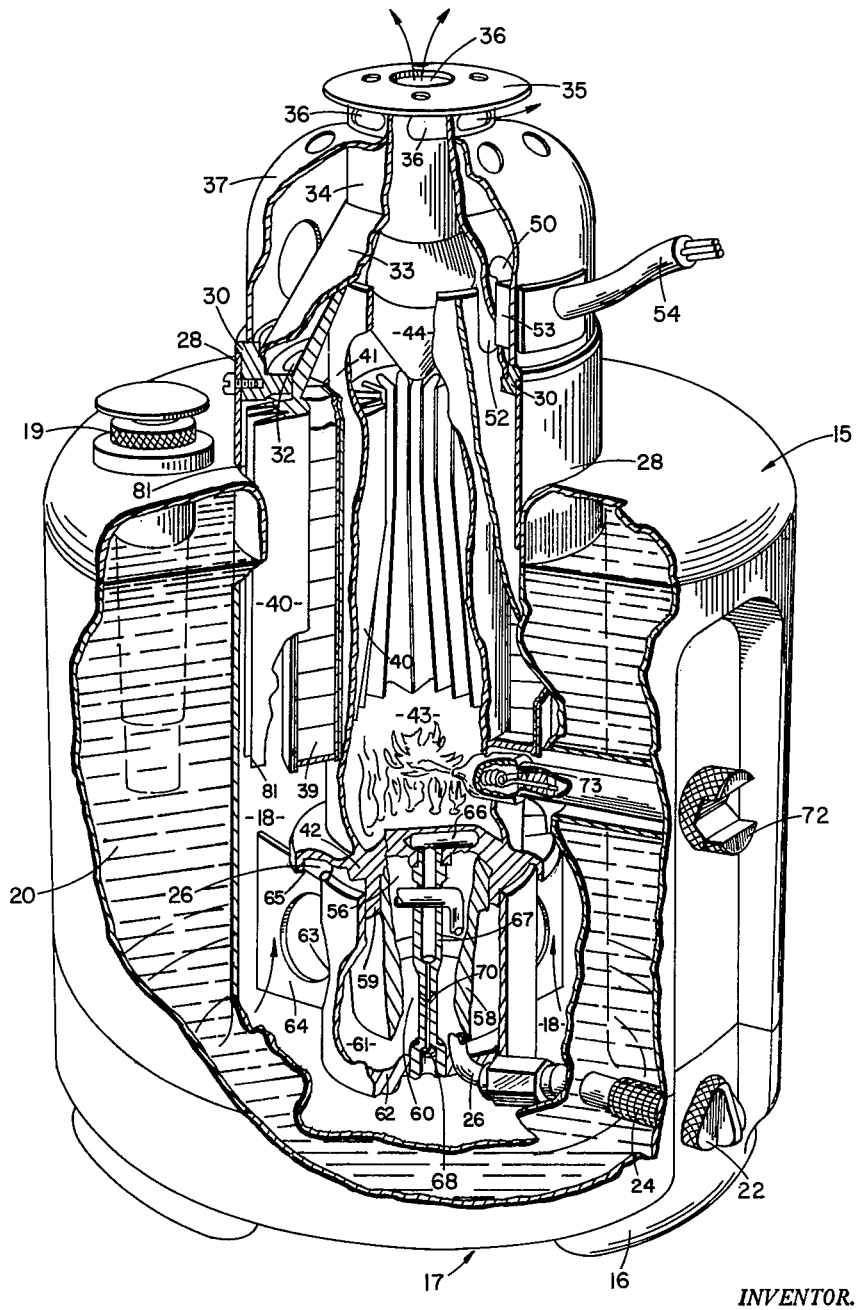
FIG. 1 is a partially sectioned perspective view of the power supply of the present invention.

Referring now to the drawings in detail, FIG. 1 shows the preferred embodiment of the present invention which comprises an annular fuel tank 15 constructed of 0.05 in. aluminum, which holds about 2.5 pounds of fuel, having supporting leg portions 16 spaced along its bottom surface to form air inlet openings 17 which communicate with the central volume 18. The fuel tank 15 is provided with a pump 19 for pressurizing the fuel 20 to an initial pressure of about 100 p.s.i. and is removable to provide a fuel inlet. A fuel supply valve 22 extends through the tank 15 and has a screened aperture 24 connecting the interior of the tank 15 with fuel line 26.

Figure 2:
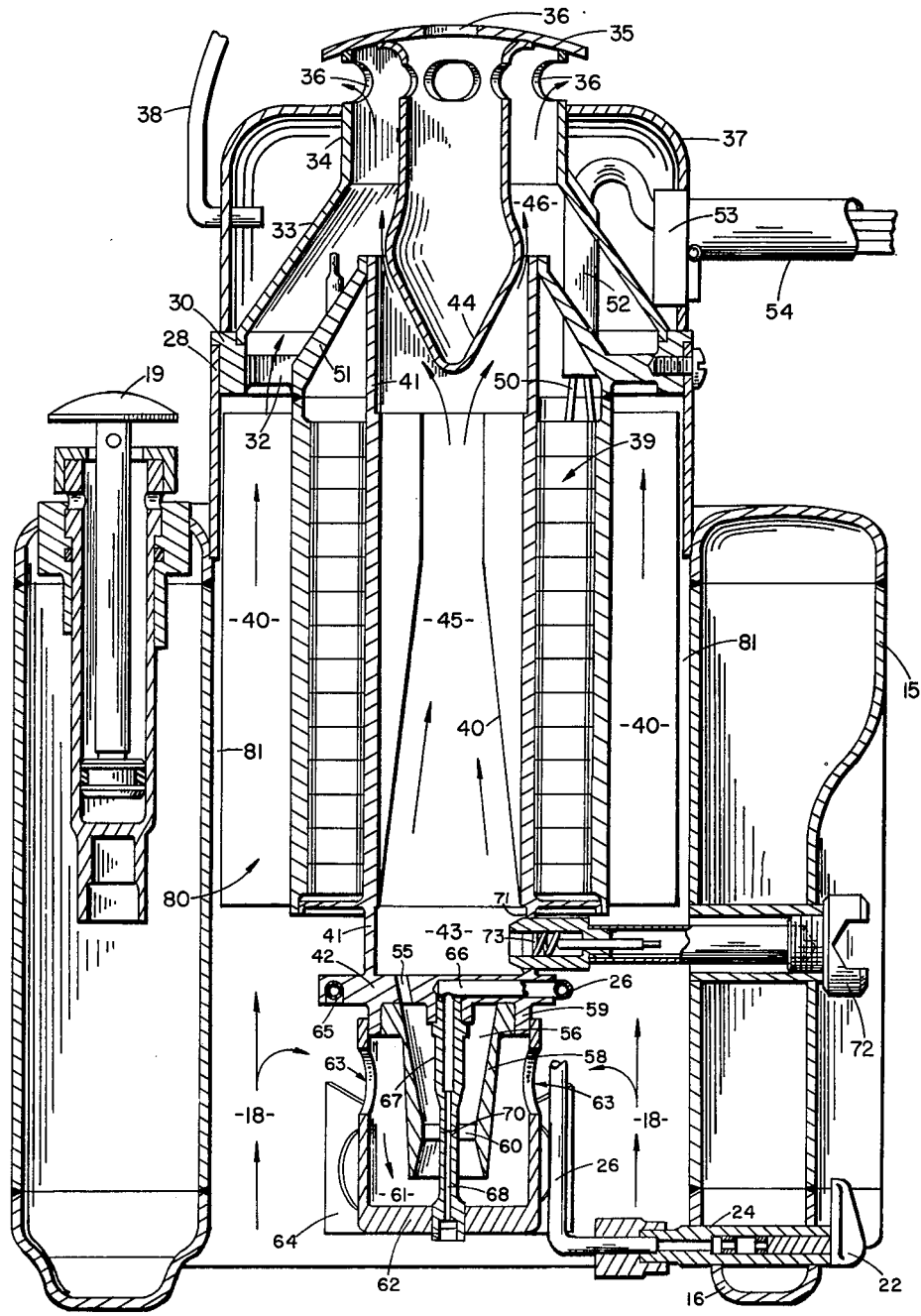
FIG. 2 is a sectional view of the power supply showing the convection circuits.

An upwardly extending tube member 28 is integrally attached to the central surface of the tank 15 and supports a flange or ring member 30 having a plurality of cooling air apertures 32. A conical flow baffle 33 circumferentially connected to the flange member 30 has an upper cylindrical portion 34 which is closed by a cap 35. Portion 34 and cap 35 are provided with a plurality of openings 36 to allow passage of air and combustion gases from the volume 18. A protective shield 37 with a handle 38 may be attached to the flange member 30. Integrally attached to the flange member 30 and supported within the volume 18 is a downwardly extending annular conversion module 39 containing at least one device for directly converting heat to electricity and having external and internal heat transfer fins 40. The inner wall or heat tube 41 of the annular module 39 extends below the remainder of the module and has a bottom closure 42 which defines the combustion chamber 43 (see FIG. 2). The inner fins 40 terminate below the top of the inner wall 41. An exhaust venturi 44 supported from the cap 35 extends downwardly into the chimney portion 34 and has its conical portion located between the inner walls 41 of the module 39, i.e., in the upper end of chimney 45.

The electrical leads 50 from the converter module pass through upper wall 51 of the module and the flow baffle 33 in an insulated sleeve 52 to a voltage indicator circuit 53 of standard construction and design to the output cable 54 which may be connected to any desired electricity-utilizing system.

The combustion chamber 43 is connected through a plurality of apertures 55 (see FIG. 2) in the closure 42 to a mixing chamber 56 defined by cylinder 58 attached to the lower flange 59 of closure 42. The mixing chamber 56 communicates through an air intake venturi 60 in cylinder 58 to an air intake chamber 61, defined by valve support cylinder 62. Chamber 61 is connected through ports 63 to the interior volume 18 of the annular fuel tank 15. Support cylinder 62 is slidable around the periphery of lower flange 59 of closure 42 and is integrally attached to the interior walls of tank 15 by a plurality of radial supports 64.

Fuel line 26 is connected from the fuel supply valve 22 and the interior of tank 15 through an annular slot 65 to aperture 66 in closure 42. Aperture 66 communicates with fuel passage element 67 to the automatic control valve 68 inserted through support cylinder 62. The valve 68 located in the center of venturi 60 controls the fuel flow from passage 67 through annular orifice 70 into the venturi 60 where the fuel is mixed with air from air intake 61. The aperture 70 changes the direction of the flow of the fuel and increases the fuel-air mixing turbulence.

An aperture 71 is provided in wall 41 adjacent combustion chamber 43 for the insertion of a lighting tool 72 which has a match holder 73 on its inner end.

Figure 3:
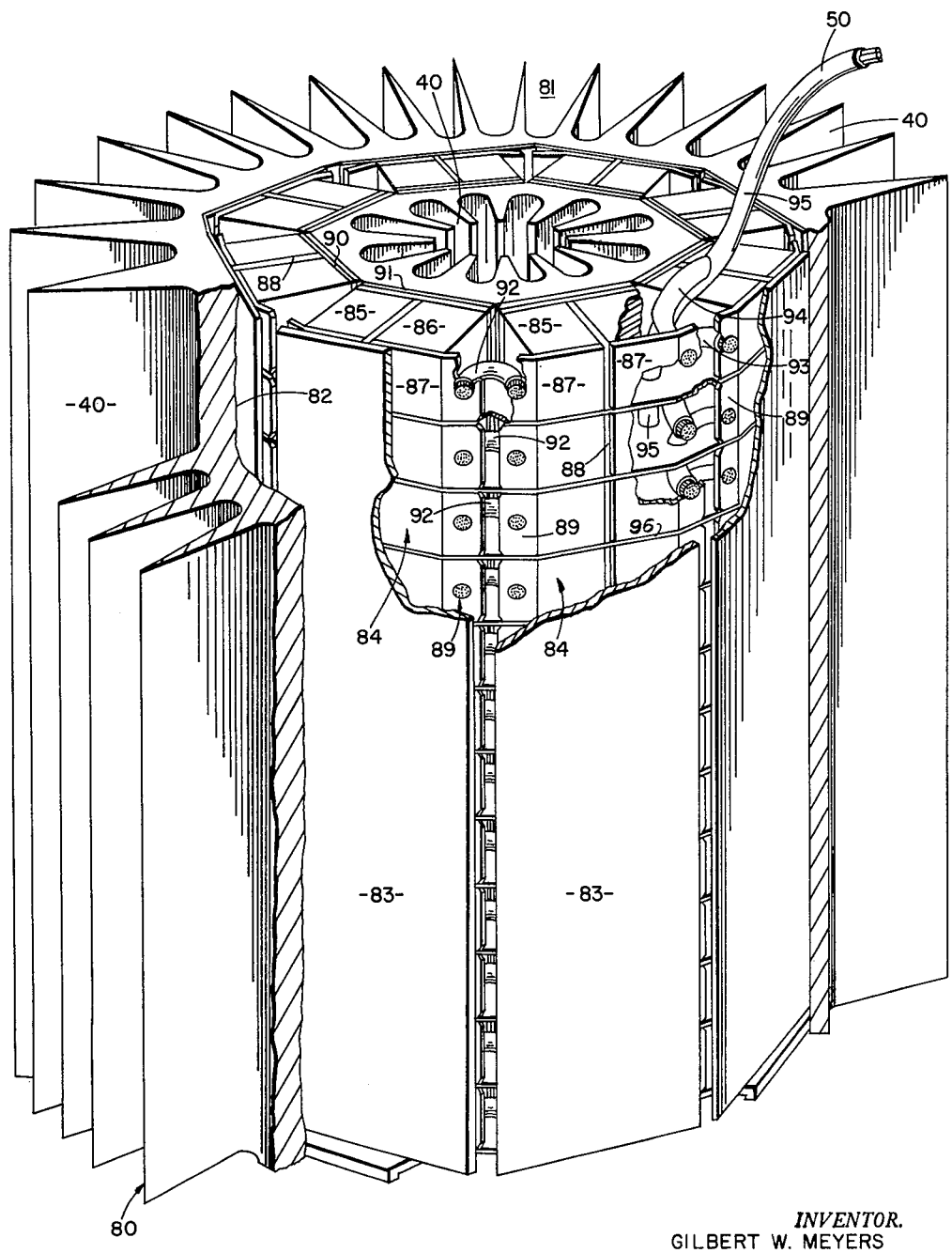
FIG. 3 is a detail perspective of the thermoelectric portion of the power supply.

The converter module 39, which is preferably a thermoelectric conversion unit, although thermionic units may be utilized, is shown in detail in FIG. 3, and comprises two annular, spaced-apart, finned elements 40 which in the preferred embodiment are an aluminum radiator 80 on the outside, defining a coolant passage 81, and finned heating tube 41 on the inside, which forms the combustion gas chimney 45. The heating tube 41, preferably fabricated of beryllium, has fins 40 which are tapered along their length to increase the heat transfer area in the direction of decreasing temperature. The inner surface 82 of the radiator element 80 is provided with a plurality of flat surfaces for mounting segmented insulation pieces 83 in spaced relation. Eight subassemblies or couples of thermoelectric elements are placed in each tier 84 within the hermetically sealed annular volume formed by the finned heating tube 41 and radiator 80. Each couple consists of one each of the n, 85, and p, 86, type thermoelements, preferably of lead telluride, but which may be fabricated of any thermoelectric material known in the art. (See Direct Conversion of Heat to Electricity, Kaye and Welsh, John Wiley & Sons, 1960.) Each layer or tier 84 of elements 85 and 86 is preferably serially connected with the tiers interconnected in series electrical relationship. However, parallel or a combination of series and parallel electrical connections may be utilized if different outputs are desired. The thermoelectric elements 85 and 86 of each subassembly are spaced apart and provided with individual cold contact iron plates 87 in heat transfer contact with insulation pieces 83 which are also spaced apart as at 88 at one end and have an electrical contact projection 89 at the other end. The sides of the elements 85 and 86 opposite to plates 87 are interconnected by a hot contact plate 90, preferably of iron. The insulator 83, as well as insulator 91 between plate 90 and heating tube 41, is fabricated from a material having good thermal conductivity but which is an electrical insulator, e.g., boron nitride. Each tier of elements is electrically insulated from adjacent tiers by a mica sheet 96. The electrical contact projections 89 are interconnected along the tiers by leads 92 with leads 93 interconnecting adjacent tiers in series relation. The top tier is connected by lead 94 to power lead 50. A lead 95 also connected to power lead 50 extends downwardly to the bottom tier of the module. In this manner the pairs of n and p elements are in thermal contact with both the hot contact 90 and cold contact 87 and utilize flat contact surfaces formed by the heating tube 41 and radiator elements 80 to provide a rigid module.

The operation of the preferred embodiment is as follows: The pump 19 is removed and fuel, e.g., gasoline, is placed in tank 15. The pump is replaced and utilized to create a pressure above the gasoline in tank 15. The operator removes the lighting tool 72 and inserts a lighted match in the holder 73 and then reinserts the tool so that the match extends through the opening 71 into the combustion chamber 43. The fuel supply valve 22 is then opened and the fuel is forced by the pressure in tank 15 through fuel line 26, aperture 66, to control valve 68. The control valve is thermally responsive so that at cold start-up the control valve is full open, i.e., as the heating tube 41 heats, it expands downwardly moving element 67 down to restrict the fuel aperture 70 and reduce fuel use. The fuel passes through elements 67 and aperture 70 into the mixing chamber 56 by action of intake venturi 60 where it is mixed with air, the air flow being shown in FIG. 2. The energy of the expanding fuel is used to pull air into the venturi 60 and increase the mixture temperature and pressure. The fuel-air mixture passes upwardly through eleven apertures 55 into the combustion chamber 43 where it is ignited by the match in holder 73. Apertures 55 are small enough to prohibit flame propagation into the control valve. The heat and combustion gases pass up the chimney 45 heating the fins 40 and are directed into a venturi channel by exhaust venturi 44 to the upper chimney 34 and to outlets 36. Air is pulled over the cooling fins of radiator 80 by a pressure difference between the noozle, formed by apertures 32, and the bottom of the cooling fins. The pressure difference is achieved by an increase in velocity of the combustion gases in the volume around the exhaust venturi 44, which volume is connected to the cooling air in the low pressure throat area. An expansion chamber 46 adjacent chimney portion 34 is then provided to balance the exhaust with atmospheric pressure. In this manner, the heat of combustion is utilized to drive a cooling air flow over the cooling fins of the thermoelectric module 39.

Thus, for operation at an air temperature of 70° F., normal atmospheric pressure, under steady-state conditions with heavy grade gasoline, the approximate characteristics of the preferred embodiment are shown in Table I.

*Table I*

| | |
|---|---|
| Power output | 30 watts. |
| Voltage output | 6 volts to matched load. |
| Operation | 12 hours continuous. |
| Lifetime | 1000 hours—12 on, 12 off. |
| Fuel | Leaded gasoline. |
| Warm-up period | 5 minutes. |

With a flame temperature of about 3600° R. utilizing a fuel flow rate of about 0.2 lbs./hr. preheated to about 500° F., the velocity at the intake venturi 60 will be about 1500 ft./sec. and the mixture pressure in chamber 56 will be about 15.5 p.s.i.a. The combustion products in chamber 43 have a low velocity to provide good flame propagation. The temperature of the gases entering the heating tube 41 is about 3470° R. and leaving the heating tube is about 1800° R. The fin temperature of radiator 80 is 320° F. with an air outlet temperature of about 200° F. and average air velocity of about 10 ft./sec. The pressure at the modified venturi 44 is 15.6 p.s.i. on the heating tube side and 14.7 p.s.i. on the radiator side. Using a velocity efficiency of 10 percent, due to the open area in the throat 46, a total of about 150 lb./hr. of cooling air may be pulled over the radiator 80. These heating and cooling circuit conditions provide a hot junction temperature of about 1000° F. and a cold junction temperature of about 400° F.

The preferred embodiment has a weight of less than 8 pounds excluding fuel.

The converter 39 consists of 96 lead telluride thermoelectric couples which are all connected in series to produce the specified voltage output in the preferred embodiment. The source of heat for the converter elements is the heating tube 41 and the source of cooling is the radiator 80. The useful heat flows from the heat tube 41 to the radiator through the electrical insulation, electrical contacts, and thermoelements. Heat which is lost to the conversion system flows through the encapsulant surrounding the thermoelements and through the thermal insulation. The outer surface of the heating tube 41 and the inner surface 82 of the radiator 80 are provided with eight flats for mounting the couples. The couples are mounted on the flats in the form of tiers 84, eight series-connected couples to the tier. The thermoelements are preferably lead telluride doped with lead iodide and sodium for the n and p types, respectively. The thermoelements are rectangular in shape, 5/16 in. long and 1/4 in. square. To attain operation at or near 1000° F., sublimation of the lead telluride must be prevented. In the preferred embodiment an encapsulant of a metallic oxide, e.g. $TiO_2$, with a vitreous enamel is utilized.

The electrical insulation 83 and 91 serves as a mechanical support for the thermoelements. The couples are under slight compression from the radial differential expansion caused by the difference in temperature of the heating tube 41 and the radiator 80. The electricity generated in the thermoelectric module because of the temperature differential existing between the hot and cold contacts may be utilized in any conventional manner, i.e., for communications or for providing light under emergency conditions.

Although the preferred embodiment has been described in terms of a gasoline-fueled 30 watt thermoelectric generator, it is within the purview of this invention to utilize other fuels, such as propane, kerosene, and other well known fuels, and to increase the size of the thermoelectric converter to provide for substantially larger electrical outputs. Further, the present invention is not limited to the specific details of the particular embodiment described, since many modifications will be apparent to those skilled in the art, the scope of the present invention being limited only by the appended claims.

What is claimed is:

1. A thermoelectric generator comprising in combination an annular hermetically sealed thermoelectric module containing a plurality of thermoelectric elements and having a central chimney and a peripheral radiator, said thermoelectric elements having their hot contact thermally connected to said chimney and their cold contacts thermally connected to said radiator, means for electrically insulating said thermoelectric elements from said chimney and said radiator, means for electrically interconnecting said thermoelectric elements within said module, a combustion chamber located at one end of said chimney, means for introducing a fuel and air mixture into said combustion chamber and passing the hot combustion products in heat exchanging relationship with said chimney, said last-named means including a fuel control valve having a fuel aperture means responsive to the temperature of said chimney for controlling said fuel control valve aperture, said controlling means including an extension connected to said chimney adapted to change said fuel aperture in response to the thermal expansion of said chimney.

2. The thermoelectric generator of claim 1 wherein said means for driving cooling air over said radiator includes an air passage along said radiator, a chamber connecting said air passage with said hot combustion gases at the end opposite said combustion chamber, an outlet above said chamber, and means in said chamber for increasing the velocity of said combustion gases to generate a pressure differential between said air passage and said chamber.

3. The thermoelectric generator of claim 2 wherein adjacent thermoelectric elements in each tier have dissimilar thermoelectric properties and having means hermetically sealing said module including said chimney and radiator and for maintaining said thermoelectric elements under compression in response to a temperature gradient between said chimney and radiator.

4. The thermoelectric generator of claim 1 including a venturi means adjacent said fuel aperture for pulling air into said combustion chamber and increasing the temperature and pressure of said mixture.

5. The thermoelectric generator of claim 2 wherein said means for creating a pressure differential between said air passage and said chamber includes a venturi element supported in said chamber and extending into said chimney adapted to increase the velocity of combustion gas flow from said chimney so as to reduce the pressure in said chamber.

6. The thermoelectric generator of claim 1 wherein said means for controlling said fuel control valve includes a rigidly supported sleeve, and wherein said extension is a fuel passage element supported by said combustion chamber adapted to be moved by the thermal expansion of said chimney and said combustion chamber relative to said rigidly supported sleeve to restrict the flow of fuel through said fuel flow aperture.

References Cited in the file of this patent

UNITED STATES PATENTS

| | | |
|---|---|---|
| 472,261 | Gulcher | Apr. 5, 1892 |
| 2,410,872 | Findley | Nov. 12, 1946 |

FOREIGN PATENTS

| | | |
|---|---|---|
| 217,012 | Great Britain | June 12, 1924 |